United States Patent
Shimada et al.

[11] Patent Number: 6,134,922
[45] Date of Patent: Oct. 24, 2000

[54] METHOD FOR DRAWING A GLASS INGOT

[75] Inventors: Tadakatsu Shimada; Hideo Hirasawa, both of Annaka, Japan

[73] Assignee: Shin-Etsu Chemical Co., Ltd., Tokyo, Japan

[21] Appl. No.: 09/100,318

[22] Filed: Jun. 19, 1998

[30] Foreign Application Priority Data

Jun. 19, 1997 [JP] Japan .................................. 9-162152

[51] Int. Cl.[7] .......................... C03B 37/07; C03B 37/025; C03B 5/235; C03B 37/029; C03B 37/10

[52] U.S. Cl. ............................... 65/377; 65/384; 65/434; 65/435; 65/385; 65/381; 65/382; 65/475; 65/477; 65/481; 65/488; 65/507; 65/509

[58] Field of Search .............................. 65/377, 384, 434, 65/435, 385, 381, 382, 475, 477, 481, 488, 507, 509, 102, 103, 29.14

[56] References Cited

U.S. PATENT DOCUMENTS

| | | |
|---|---|---|
| 4,101,300 | 7/1978 | Imoto et al. |
| 4,304,582 | 12/1981 | Aussenegg et al. |
| 4,362,545 | 12/1982 | Bailey et al. |
| 4,372,767 | 2/1983 | Maklad |
| 4,578,098 | 3/1986 | Paek et al. |
| 4,925,473 | 5/1990 | Jeskey et al. |
| 5,079,433 | 1/1992 | Smith |
| 5,308,947 | 5/1994 | Fleming, Jr. |
| 5,316,562 | 5/1994 | Smithgall et al. |
| 5,320,658 | 6/1994 | Ohga et al. |
| 5,755,849 | 5/1998 | Hoshino et al. |

FOREIGN PATENT DOCUMENTS

| | | |
|---|---|---|
| 0 097 348 A1 | 1/1984 | European Pat. Off. |
| 0 578 244 A1 | 1/1994 | European Pat. Off. |
| 63-206327 | 8/1988 | Japan |
| 3-126634 | 5/1991 | Japan |
| 4-198036 | 7/1992 | Japan |
| 4-325427 | 11/1992 | Japan |
| 6-239639 | 2/1993 | Japan |
| 6-239639 | 8/1994 | Japan |
| 2 307 907 | 11/1997 | United Kingdom |

*Primary Examiner*—Stanley S. Silverman
*Assistant Examiner*—Jacqueline A. Ruller
*Attorney, Agent, or Firm*—McDermott, Will & Emery

[57] ABSTRACT

A method for drawing a glass ingot into a rod having a given outer diameter is described. The method is characterized in that when the glass ingot is fed into a heating zone at a final tapered portion thereof, a temperature in the heating zone is decreased so that the final tapered portion is prevented from being drawn in excess owing to the heat from the heating zone.

7 Claims, 4 Drawing Sheets

FIG. 1a
FIG. 1b
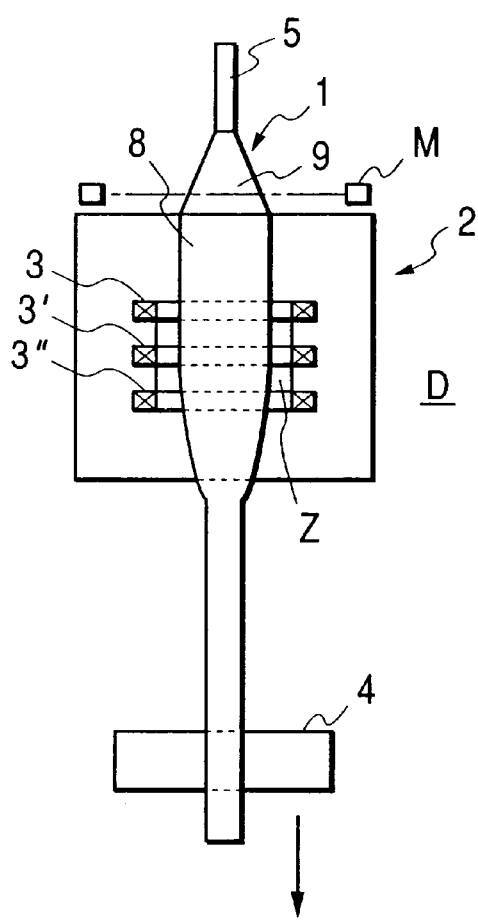
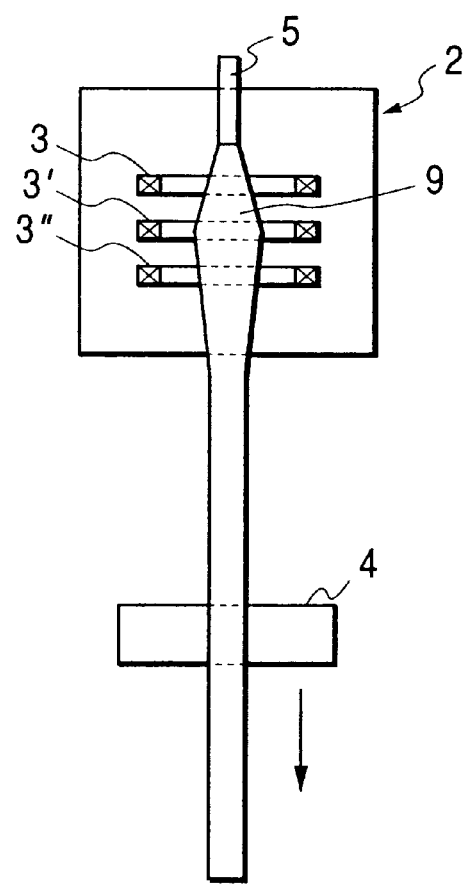

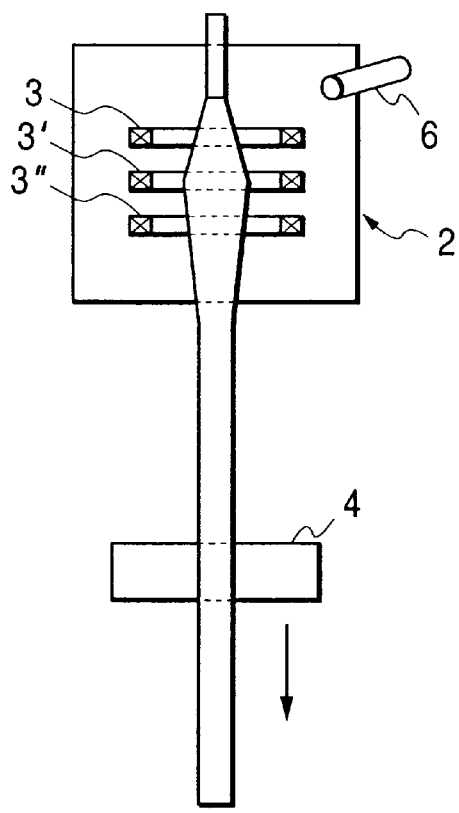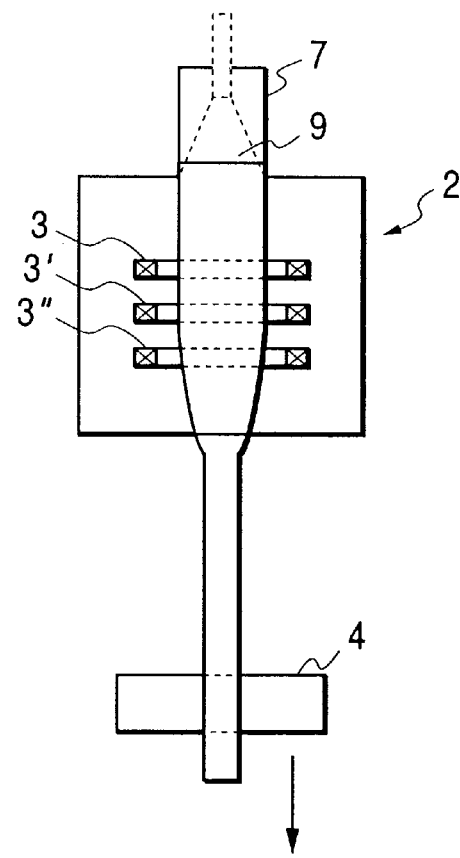
FIG. 2
FIG. 3

METHOD FOR DRAWING A GLASS INGOT

BACKGROUND OF THE INVENTION

1. Field of the Invention

This invention relates to a method for drawing a glass ingot wherein the glass ingot is drawn to a predetermined outer diameter to obtain a glass rod or preform for an optical fiber having the predetermined outer diameter.

2. Description of the Prior Art

For the drawing of a large-sized glass ingot having a diameter exceeding 100 mm, there is usually used a method wherein the ingot is heated and softened in an electric furnace, under which it is drawn by application of a given tension thereto. Such a large-sized ingot is schematically shown in FIG. 4. In the figure, an ingot 10 has a body 12 and tapered portions 14, 14' at opposite sides thereof. The tapered portions 14, 14' are, respectively, connected to dammy portions 16, 16'.

For the drawing, the ingot 10 is set in position of an electric furnace 18 having a heating unit 20 provided to surround the ingot 10 therearound as shown in FIG. 5. Reference numeral 22 indicates take-up rollers.

When the ingot 10 having a diameter of D1 is fed at a rate of V1 and drawn to a diameter of D2 at a take-up rate V2, the following relationship is established $$D1^2 \times V1 = D2^2 \times V2.$$

In this way, a preform having the diameter of D2 can be obtained. In this connection, however, when the drawing proceeds to a final stage where an upper tapered portion is heated, this portion is more likely to heat to a temperature higher than the body portion 12 since the diameter of the tapered portion 14 is gradually reduced. Accordingly, when a given quantity of heat is invariably applied to the ingot 10, the upper tapered portion 14 is much more quickly drawn, so that a portion 12a of the body portion 12 contiguous to the tapered portion 14 is drawn into a preform whose diameter is larger than an intended one. This is particularly shown in FIG. 6. More particularly, the portion 12a cannot be drawn to a given outer diameter because of the ease in the drawing at the tapered portion 14, but with a relatively great increase in the diameter as shown.

To avoid this, many attempts have been made wherein while the outer diameter of the tapered portion is monitoring, the data of the outer diameter is fed back to a control unit, but without success.

SUMMARY OF THE INVENTION

It is therefore an object of the invention to provide a method for drawing a glass ingot which overcomes the above-mentioned problem.

It is another object of the invention to provide a method for drawing a glass ingot wherein when a large-sized ingot is drawn, a body of the ingot can be drawn substantially at a uniform level of outer diameter over its overall length.

It is a further object of the invention to provide an apparatus for carrying out the method mentioned above.

The above objects can be achieved, according to the invention, by a method for drawing a glass ingot into a preform or rod having a predetermined outer diameter, wherein when the glass ingot is fed into a heating zone in the vicinity of at a final tapered portion thereof, a temperature in the heating zone is decreased so that the final tapered portion is prevented from being drawn in excess due to the heat from the heating zone.

In the heating zone, a plurality of separate heater units are preferably provided. In order to lower the temperature in the heating zone, the outer diameter of the ingot is invariably monitored and fed back to a power supply unit for individual heater units to lower or stop electric power passed to the plurality of separate heater units. More particularly, as the tapered portion comes near to the heating zone at a given feed rate, the supply of electric power to the plural heater units is reduced or stopped one by one or all at once.

Moreover, an electric furnace having the heating zone may be cooled by appropriate cooling means particularly at an upper portion of the furnace. As a result, heat applied to the tapered portion can be reduced or removed to an extent. Alternatively, a large amount of an inert gas such as nitrogen, argon or the like may be passed to the upper portion of the electric furnace. Still alternatively, a cooling means may be provided at the upper portion of the electric furnace, in which a cooling fluid is passed to control the temperature at the upper portion in the heating zone. Yet alternatively, the upper tapered portion may be covered with a heat insulating material. If necessary, the heat insulating material may be provided with a cooling means therein.

BRIEF DESCRIPTION OF THE DRAWINGS

FIGS. 1a and 1b are, respectively, schematic longitudinal sectional views illustrating an apparatus of drawing a glass ingot suited to carry out one embodiment of the invention wherein FIG. 1a illustrates heating of a body with a given outer diameter and FIG. 1b illustrates heating of an upper tapered portion in a heating zone of the apparatus;

FIG. 2 is a schematic longitudinal section illustrating an apparatus of drawing a glass ingot suited to carry out another embodiment of the invention;

FIG. 3 is a schematic longitudinal section illustrating an embodiment of the invention;

DESCRIPTION OF THE PREFERRED EMBODIMENTS

Figure 4:
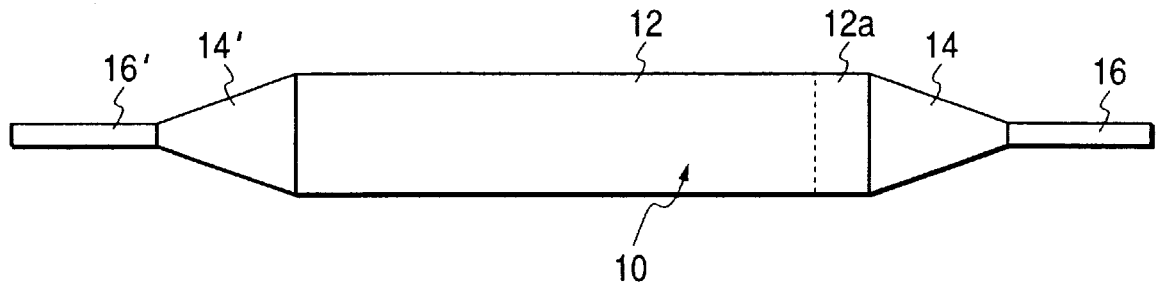
FIG. 4 is a schematic view illustrating a glass ingot.

FIG. 1a shows a drawing apparatus suitable for carrying out one embodiment of the invention. In the figure, there is shown a drawing apparatus D which includes an electric furnace 2 having a plurality of separate tubular heater units 3, 3' and 3" to establish a heating zone Z surrounded with the heater units 3 to 3". A glass ingot 1, which is fixed at an upper end thereof via a dammy portion 5 with a work feed chuck (not shown), is vertically set in the furnace 2 and is drawn at a given drawing rate, for example, of 20 mm/minute. The ingot 1 has a body portion 8 with a given outer diameter and a tapered portion 9 at opposite sides thereof. The individual tapered portion 9 is fixed with the dammy rod 5, which is, in turn, fixed with the chuck (not shown) at an upper end thereof. In FIG. 1a, reference numeral 4 indicates a take-up device made, for example, of take-up rollers.

Figure 5:
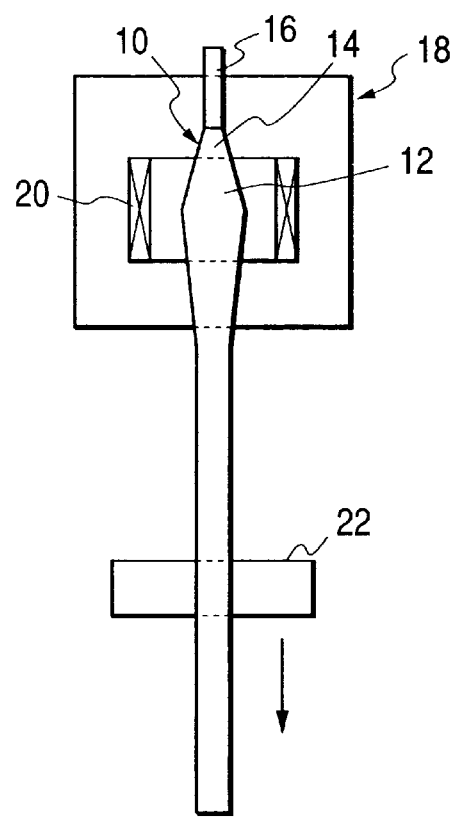
FIG. 5 is a schematic longitudinal section illustrating a prior art apparatus of drawing a glass ingot.

The glass ingot 1 is of the type shown in FIG. 5 having illustrated in the prior art. Once again, the ingot used in the present invention is briefly described with reference to FIG.

4. In FIG. 4, an ingot 10 corresponding to the ingot 1 of FIGS. 1a, 1b has a body portion 12 and tapered positions 14, 14' fixedly connected to dammy portions 16, 16' respectively. A portion 12a is in the proximity of the tapered portion 14. This portion 12a should be drawn at a given outer diameter while preventing excessive drawing of the tapered portion as is caused by application of heat from the heating zone Z.

The ingot 1 shown in FIGS. 1a and 1b is made of silica glass and usually has an outer diameter of 110 to 200 mm and a weight of 30 to 100 kg.

The heater units 3, 3' and 3" are vertically arranged separately as shown and are individually controlled by connection to separate power supplies (not shown). The outer diameter of the ingot 1 is measured by use of an outer diameter measuring instrument M in a manner as is known in the art. When the body portion 8 is drawn as shown in FIG. 1a, all the heaters are so set that the ingot is kept at a given temperature, at which the drawing proceeds smoothly to provide a rod with substantially a given outer diameter.

When the ingot 1, which is vertically suspended such that the tapered portion 9 is set upward, is in the proximity of the heater unit 3 at the tapered portion 9, the electric power applied, at least, to the heater unit 3 is lowered or stopped depending on the outer diameter of the tapered portion. When the tapered portion further enters into the heating zone Z as shown in FIG. 1b, the heater units 3, 3' and 3" are so controlled as to gradually reduce or, in some cases, completely stop power supplied thereto, thereby permitting the tapered portion 9 to be kept at the given temperature.

Figure 6:
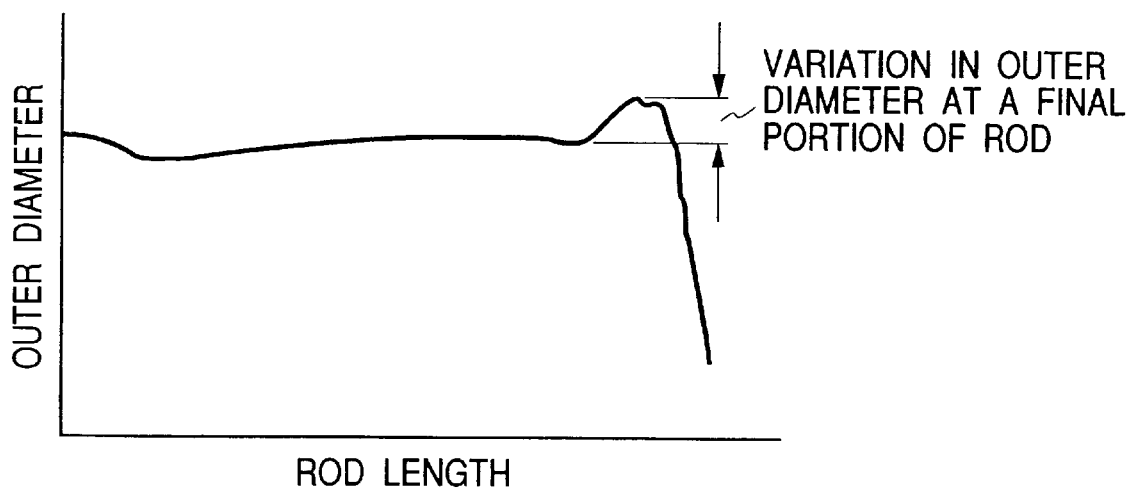
FIG. 6 is a schematic view showing a variation in outer diameter of a rod or preform drawn according to a prior art method using the type of apparatus of FIG. 5.

When a glass ingot is drawn by use of a prior art apparatus shown in FIG. 5 and its diameter in a zone surrounded by the heater 20 is measured with respect to the outer diameter thereof. The outer diameter in this zone is kept, in a steady drawing condition, at a given level of (a final outer diameter of a preform×α) wherein α=1.005 to 1.50. However, if the portion 12a in FIG. 4 is drawn, the outer diameter gradually increases because the tapered portion 14 is more liable to be drawn. The resultant preform has a larger outer diameter as shown in FIG. 6. To avoid this, an outer diameter of the tapered portion or an outer diameter in the heating zone surrounded by a plurality of heating units is measured, and is compared with an intended value of outer diameter. The results of the comparison reflect on the power supply to individual heating units.

In the practice of the invention, it is preferred that a final rod has a given outer diameter throughout its overall length with its variation being as small as possible and ranging, for example, from ±1% of the rod diameter.

The electric power to be applied to individual heater units has been preliminarily determined in relation to the variation in outer diameter of the tapered portion 9 for different drawing rates. For instance, when an ingot having 200 mm is fed at a rate of 20 mm/minute and drawn at a rate of 80 mm/minute, a rod having an outer diameter of 100 mm is obtained. In the vicinity of the portion 12a in FIG. 4, the tapered portion 14 is too liable to be drawn so far as heat in the heating zone Z in FIG. 1a or 1b is maintained constant. This results in a larger outer diameter of the resultant rod corresponding to the portion 12a. Accordingly, a variation in outer diameter of the tapered portion 9 is monitored, and power supplies to the individual heater 3 to 3" are lowered or stopped one by one or all at one depending on the variation. As set out above, the relation between the power supplies to individual heaters and the variation in the outer diameter of the tapered portion has been determined beforehand. The power supplies are individually controlled based on the relation via an operational control unit (not shown).

It should be noted that only three heater units are depicted in FIGS. 1a and 1b, and four or more units may be used if more precise temperature control is required.

In the above embodiment, the heater units are individually controlled to keep the tapered portion at the given temperature. In this connection, however, even if power supply to individual heater units is stopped, the heating zone is not immediately cooled down because of the heat capacity of the electric furnace. In order to quickly cool, at least, the heating zone Z, it is preferred to forcedly cool the electric furnace with a gas passed through a cooling gas port 6 from above the electric furnace 2 as shown in FIG. 2. The cooling gas used for this purpose may be nitrogen gas, argon gas or helium gas at normal temperature. Such a gas as mentioned above is usually fed at a rate of 0.1 to 50 $m^3$/minute.

Moreover, although not particularly shown, cooling means, through which a cooling medium is passed, may be likewise used in place of the cooling gas port and its related cooling gas feeder. For instance, a cooling pipe of a desired shape may be provided around the heating units 3 to 3", through which a cooled gas or a gas containing a coolant may be passed.

Still alternatively, the tapered portion 9 may be covered with a heat insulating material 7 as shown in FIG. 3. The glass ingot used in the method of the invention is made, for example, of silica glass. The heat insulating material used for this purpose should preferably be made of a material whose thermal conductivity is substantially equal to or smaller than that of the glass ingot although a heating insulating material, which has a thermal conductivity larger than silica or quartz glass, may be used. The coverage with such a heat insulating material at the tapered portion can prevent heat from transmitting to the tapered portion, thereby suppressing a temperature rise of the portion.

Moreover, a metallic cover may also be used. In this case, such a cover should preferably have a passage therein, through which a coolant, such as water, is passed. Examples of the metal used as a cover include stainless steels, Ti and the like. If this type of cover is used, the temperature rise of the tapered portion can be more effectively prevented.

The invention is more particularly described by way of examples.

EXAMPLE 1

A quartz glass having an outer diameter of 150 mm, a body length of 400 mm and a tapered portion narrowed to a minimum outer diameter of 30 mm was drawn at a feed rate of 30 mm/minute and a take-up rate of 270 mm/min into a product rod with an outer diameter of 50 mm by use of a drawing apparatus of the type shown in FIG. 2. The apparatus had two separate tubular heater units, each having an inner diameter of 200 mm and a height of 100 mm. When an upper tapered portion came close to an electric furnace of the drawing apparatus, the electric power applied to the upper heater unit was gradually reduced, under which the ingot was drawn into a product rod with an outer diameter of 50 mm. As a result, it was found that a variation in the outer diameter was reduced to 3 mm. Further, another glass ingot was drawn while introducing nitrogen gas into the electric furnace at normal temperatures at a rate of 30 $m^3$/minute from a gas port, a variation in the outer diameter was reduced to 1 mm.

EXAMPLE 2

The general procedure of Example 1 was repeated except that a carbon heat-insulating felt with a thickness of 2 cm was used to cover the tapered portion therewith. As a result, it was found that a variation in outer diameter of the resultant product rod with an outer diameter of 50 mm was reduced to 2 mm.

The above procedure was also repeated using a heating insulating cover made of titanium and having a fluid coolant passage therein, through which 100 liters/minute of water was passed. In this condition, a glass ingot was drawn, with the result that a variation in outer diameter of the resultant produce rod was reduced to 0.5 mm.

COMPARATIVE EXAMPLE

Using an existing apparatus shown in FIG. 5, a quartz glass having an outer diameter of 150 mm, a body length of 400 mm and a tapered portion narrowed down to its minimum outer diameter of 30 mm was drawn at a feed rate of 30 mm/minute and a take-up rate of 270 mm into a product rod having an outer diameter of 50 mm. The apparatus had only one tubular heater unit having an inner diameter of 200 mm and a height of 200 mm. The resultant product rod having an outer diameter had a variation in the diameter of 5 mm, and the variation was greater particularly at the final end portion of the rod.

As will be apparent from the foregoing, when a glass ingot is drawn, heat applied to the upper tapered portion, which is more liable to be drawn than its body portion, is appropriately controlled so that the body portion in the vicinity of the upper tapered portion is well controlled in its drawing rate, suffering little variation in the outer diameter of a final rod over the full length of the body portion.

What we claim is:

1. A method for drawing a glass ingot into a rod having a given outer diameter, wherein said glass ingot, having a terminal tapered portion, is fed into a heating zone comprising a plurality of heater units, wherein a temperature in the heating zone is controlled by controlling electric power supplied to the plurality of heater units, wherein the temperature in the heating zone is decreased so that said terminal tapered portion is prevented from being drawn in excess owing to the heat from the heating zone.

2. A method according to claim 1, wherein the plurality of heating units are vertically arranged, and the plurality of heating units are individually controlled by decreasing electric power supplied to the plurality of heater units.

3. A method according to claim 1, wherein the temperature of said heating zone is controlled by cooling an upper portion of said heating zone.

4. A method according to claim 3, where the temperature of said heating zone is controlled by blowing a large amount of an inert gas to said heating zone.

5. A method according to claim 2, wherein the temperature of said heating zone is controlled by providing a cooling means to said heating zone through which a cooling medium is passed.

6. A method according to claim 1, wherein an upper portion of said tapered portion of said glass ingot is covered with a heat insulating material to prevent excess heating of the tapered portion.

7. A method according to claim 6, wherein said heat insulating material is cooled to remove heat from the heating zone.

* * * * *